United States Patent [19]

Hargrove

[11] Patent Number: 5,431,253

[45] Date of Patent: Jul. 11, 1995

[54] BRAKING SYSTEM FOR USE ON A TOWING VEHICLE AND ON A TOWED VEHICLE

[76] Inventor: Herbert D. Hargrove, 800 W. Naranja, Tucson, Ariz. 85737

[21] Appl. No.: 295,401

[22] Filed: Aug. 25, 1994

[51] Int. Cl.$^6$ .............................................. B60T 7/02
[52] U.S. Cl. ........................... 188/3 H; 188/112 R
[58] Field of Search ............... 188/3 R, 3 H, 112 R; 303/7, 9, 9.66, 20, 31, 70

[56] References Cited

U.S. PATENT DOCUMENTS

| | | | |
|---|---|---|---|
| 2,850,330 | 9/1958 | Andrews | 188/3 H |
| 3,951,464 | 4/1976 | Donahue et al. | 188/3 R |
| 3,995,911 | 12/1976 | Kasselmann et al. | 188/3 R |
| 4,052,695 | 10/1977 | Myers | 188/3 R |
| 4,348,062 | 9/1982 | Koenig | 303/7 |
| 4,697,853 | 10/1987 | Scholz | 188/3 R |
| 4,756,390 | 7/1988 | Meadows | 188/3 R |
| 5,031,729 | 7/1991 | Wittkop et al. | 188/112 R |

*Primary Examiner*—Robert J. Oberleitner
*Assistant Examiner*—Chris Schwartz

[57] ABSTRACT

A braking system for use on a towing vehicle and on a towed vehicle comprises a vacuum capture mechanism for capturing vacuum from a towing vehicle. A vacuum delivery mechanism is provided for delivering vacuum to a towed vehicle. A switch mechanism is also provided for allowing controlled transfer of vacuum to a towed vehicle. A vacuum reception mechanism is coupleable with the vacuum delivery mechanism for receipt of vacuum. An air pressure mechanism is adapted to be coupled to a towed vehicle for generating air pressure when actuated. A ram mechanism is coupled to the air pressure mechanism for depressing a brake pedal of a towed vehicle when the air pressure mechanism is actuated. A vacuum switch mechanism is coupled to the vacuum reception mechanism. The vacuum switch mechanism has one orientation for actuating the air pressure mechanism upon receipt of vacuum. A check valve switch mechanism is coupled to the vacuum switch mechanism and adapted to be coupled to a brake vacuum system of a towed vehicle for receipt of vacuum therefrom.

4 Claims, 4 Drawing Sheets

BRAKING SYSTEM FOR USE ON A TOWING VEHICLE AND ON A TOWED VEHICLE

BACKGROUND OF THE INVENTION

1. Field of the Invention

The present invention relates to a braking system for use on a towing vehicle and on a towed vehicle and more particularly pertains to allowing the brakes of a towed vehicle to be applied in conjunction with the brakes of the towing vehicle with a braking system for use on a towing vehicle and on a towed vehicle.

2. Description of the Prior Art

The use of brake systems is known in the prior art. More specifically, brake systems heretofore devised and utilized for the purpose of allowing brakes to be applied on vehicles are known to consist basically of familiar, expected and obvious structural configurations, notwithstanding the myriad of designs encompassed by the crowded prior art which have been developed for the fulfillment of countless objectives and requirements.

By way of example, U.S. Pat. No. Des. 260,508 to Weiner discloses a tow vehicle brake pedal attachment for an electric trailer brake system. U.S. Pat. No. 3,768,870 to Howard discloses an electrically actuated trailer brake control system. U.S. Pat. No. 4,538,859 to Russell discloses an auxiliary mechanical and physically controlled electronic actuated air pressure handling apparatus for truck and trailer braking systems. U.S. Pat. No. 5,050,938 to Brearley et al. discloses trailer braking in electronically controlled braking systems. U.S. Pat. No. 5,172,958 to Sell discloses an air brake control valve system.

While these devices fulfill their respective, particular objective and requirements, the aforementioned patents do not describe a braking system for use on a towing vehicle and on a towed vehicle that allows the brakes of a towed vehicle to be applied with the brakes of a towing vehicle when the towed vehicle is being towed by the towing vehicle and also allows the brakes of the towed vehicle to operate normally when the towed vehicle is being operated apart from the towing vehicle.

In this respect, the braking system for use on a towing vehicle and on a towed vehicle according to the present invention substantially departs from the conventional concepts and designs of the prior art, and in doing so provides an apparatus primarily developed for the purpose of allowing the brakes of a towed vehicle to be applied in conjunction with the brakes of the towing vehicle.

Therefore, it can be appreciated that there exists a continuing need for new and improved braking system for use on a towing vehicle and on a towed vehicle which can be used for allowing the brakes of a towed vehicle to be applied in conjunction with the brakes of the towing vehicle. In this regard, the present invention substantially fulfills this need.

SUMMARY OF THE INVENTION

In the view of the foregoing disadvantages inherent in the known types of brake systems now present in the prior art, the present invention provides an improved braking system for use on a towing vehicle and on a towed vehicle. As such, the general purpose of the present invention, which will be described subsequently in greater detail, is to provide a new and improved braking system for use on a towing vehicle and on a towed vehicle and method which has all the advantages of the prior art and none of the disadvantages.

To attain this, the present invention essentially comprises, in combination, a towing vehicle braking subsystem. The towing vehicle braking subsystem is adapted for use in a towing vehicle. The towing vehicle braking subsystem includes a tubular metal vacuum line having a first end and a second end with the first end adapted to be coupled to a vacuum intake manifold of a towing vehicle for receipt of vacuum. The towing vehicle braking subsystem includes a vacuum canister reservoir for maintaining vacuum from the intake manifold with the vacuum canister reservoir having a first port and a second port with the first port coupled to the second end of the vacuum line. The towing vehicle braking subsystem includes a manual vacuum switch for controlling vacuum provided through the vacuum canister reservoir. The manual vacuum switch is adapted to be coupled to an instrument panel of a towing vehicle. The manual vacuum switch has a first port, a second port, and a third port with the manual vacuum switch having an engaged orientation for allowing communication between the first port and the second port for transfer of vacuum and a disengaged orientation for allowing communication between the second port and third port for dissipation of vacuum. The first port of the vacuum switch is coupled to the second port of the vacuum canister reservoir. The towing vehicle braking subsystem includes an electromagnetic first air valve having a first port, a second port, third port, and an electrically conductive terminal formed thereon for controlling port operation and with the terminal adapted to be coupled to a foot brake stop light switch on a towed vehicle. The first air valve has an engaged orientation for allowing communication between the first port and the second port for transfer of vacuum when the terminal is electrically energized through activation of the foot brake stop light switch and a disengaged orientation for allowing communication between the second port and the third port for dissipation of vacuum when the terminal is electrically deenergized through deactivation of the foot brake stop light switch. The first port of the first air valve is coupled with the second port of the manual vacuum switch. Lastly, the towing vehicle braking subsystem includes a self-closing coupler adapted to be coupled to a rear of a towing vehicle. The coupler has a port coupled to the second port of the first air valve. The port is further adapted to be mated with a quick disconnect self-closing air chuck for transfer of vacuum.

A towed vehicle braking subsystem is included. It is adapted for use in a towed vehicle and associated with the towing vehicle braking subsystem. The towed vehicle braking subsystem includes a spring-activated first check valve having a first port and a second port with the first port adapted to be coupled to a vacuum line of a towed vehicle and with the second port adapted to be coupled to a brake vacuum booster of a towed vehicle. The towed vehicle braking subsystem includes a spring-activated second check valve having a first port and a second port with the first port coupled to the second port of the first check valve and with the first port further adapted to be coupled to an existing vacuum booster of a towed vehicle, whereby when the towed vehicle is being towed by the towing vehicle, the first check valve is prevented from communicating with the vacuum booster while the second check valve is allowed to communicate with the vacuum booster, and when the towed vehicle is driven apart from the towing vehicle, the first check valve is allowed to communicate with the vacuum booster and the second check valve is prevented from communicating with the vacuum booster. The towed vehicle braking subsystem includes an air pump adapted be coupled to a towed vehicle with the air pump having a first port, a second port, and an electrically conductive terminal formed thereon with the air pump supplying air pressure at the ports when the terminal thereof is electrically energized. The towed vehicle braking subsystem includes an electromagnetic second air valve having a first port, a second port, a third port, and an electrically conductive terminal formed thereon for controlling port operation. The second air valve has an engaged orientation for allowing communication between the first port and second port for transfer of air pressure when the terminal is electrically energized and a disengaged orientation for allowing communication between the second port and third port for dissipation of air pressure when the terminal is electrically de-energized. The towed vehicle braking subsystem includes an adjustable pressure regulator having a first port, a second port, and a readable pressure gauge formed thereon with the first port coupled to the second port of the air pump and the second port coupled with the first port of the second air valve and with the pressure regulator utilized for regulating air pressure delivered from the air pump. The towed vehicle braking subsystem includes an electromagnetic third air valve having a first port, a second port, a third port, and an electrically conductive terminal formed thereon for controlling port operation with the third air valve having an engaged orientation for all owing communication between the first port and the second port when the terminal is electrically energized for transfer of air pressure and with the third air valve having a disengaged orientation for allowing communication from the first port to the third port when the terminal is deenergized for dissipation of air pressure. The first port of the third air valve is coupled to the first port of the air pump and the third port of the third air valve is adapted to be coupled to the vacuum booster of a towed vehicle. The towed vehicle braking subsystem includes an air intake having a first port, a second port, a third port, and an intake port with the first port coupled to the second port of the third air valve and the intake port adapted to receive external air for subsequent delivery to the air pump. The towed vehicle braking subsystem includes a mechanical mass air release having a first port, a second port, and a third port. The first port is coupled to the second port of the second air valve and the third port coupled to the second port of the air intake and the third port of the second air valve. The mechanical mass air release has an engaged orientation for allowing communication between the first port and the second port for transfer of air pressure. The mechanical mass air release has a disengaged orientation for allowing communication between the second port and third port for dissipation of air pressure. The towed vehicle braking subsystem includes an air ram having a tubular and sealed housing, a plunger having a base end slidably disposed therein and a tip end extended therefrom adapted to be coupled to a brake pedal of a towed vehicle, a first port and a second port with the first port coupled with the second port of the mechanical mass air release and with the second port coupled to the third port of the air intake. The plunger is extendable in one orientation for depressing a brake pedal of a towed vehicle when the mechanical mass air release is placed in an engaged orientation and retractable in another orientation for releasing a brake pedal of a towed vehicle when the mechanical mass air release is placed in a disengaged orientation. The towed vehicle braking subsystem includes a quick-disconnect self-closing air chuck having a first port and a second port with the first port mateable with the self-closing coupler of the towing brake subsystem. Lastly, the towed vehicle braking subsystem includes a pneumatically actuateable and electrically conductive double-pull single throw vacuum switch having a first port, a second port, a first terminal and a second terminal with the first port coupled to the second port of the air chuck and the second port coupled to the second port of the second check valve. The first terminal is coupled to the terminal of the second air valve and the terminal of the third air valve and the terminal of the air pump and adapted to be coupled to a battery of a towing vehicle. The second terminal is coupled to the terminal of the air pump and adapted to be coupled to a brake light of a towing vehicle and adapted to be coupled to a battery, of a towing vehicle. When the towed vehicle braking subsystem is coupled to the towing vehicle braking subsystem through mating of the self-closing coupler with the air chuck and vacuum is applied to the vacuum switch of the towing vehicle, the terminals thereof are energized for activating the air pump and thus allowing subsequent depression of a brake pedal of a towed vehicle through application of air pressure at the air ram. When vacuum is removed from the vacuum switch of the towing vehicle, the terminals thereof are deenergized for deactivating the air pump and thus allowing release of a brake pedal of a towed vehicle through release of air pressure from the air ram.

Lastly, a break-away subsystem is included. It is adapted for use in a towed vehicle and associated with a towing vehicle. The break-away subsystem includes a contact switch adapted to be coupled to a towed vehicle with the contact having a pair of spring-loaded prongs on one and a terminal formed on the other end coupled to the first terminal of the double-pole single throw vacuum switch. The contact switch has an activated orientation when the prongs are engaged and a deactivated orientation when the prongs are disengaged. The break-away subsystem further includes a single-pole single throw activation switch coupled to the air ram with the activation switch orientable in a closed position for activating the towed vehicle brake subsystem when the towed vehicle is being towed by the towing vehicle and orientable in an open position for deactivating the towed vehicle brake subsystem when the towed vehicle is being driven apart from the towing vehicle. The break-away subsystem further includes a chain having a first end and a second end with the first end adapted to be coupled to a towing vehicle. Lastly, the break-away subsystem further includes an elongated clip having a base end and a tip end with the base end removably coupled to the second end of the chain and the tip end having an insulative detent formed thereon securable between the prongs of the contact switch for placing it in a deactivated orientation. When a towed vehicle is being towed by a towing vehicle and the insulative detent is removed from between the prongs of the spring contact through excess tension on the chain extended between the towed vehicle and towing vehicle, the spring contact is placed in an activated orientation for engaging the vacuum switch and thus activating the air pump for depressing a brake pedal of a towed vehicle through the air ram.

It is therefore an object of the present invention to provide a new and improved braking system for use on a towing vehicle and on a towed vehicle which has all the advantages of the prior art brake systems and none of the disadvantages.

It is another object of the present invention to provide a new and improved braking system for use on a towing vehicle and on a towed vehicle which may be easily and efficiently manufactured and marketed.

It is a further object of the present invention to provide a new and improved braking system for use on a towing vehicle and on a towed vehicle which is of durable and reliable construction.

An even further object of the present invention is to provide a new and improved braking system for use on a towing vehicle and on a towed vehicle which is susceptible of a low cost of manufacture with regard to both materials and labor, and which accordingly is then susceptible of low prices of sale to the consuming public, thereby making such a braking system for use on a towing vehicle and on a towed vehicle economically available to the buying public.

Still yet another object of the present invention is to provide a new and improved braking system for use on a towing vehicle and on a towed vehicle which provides in the apparatuses and methods of the prior art some of the advantages thereof, while simultaneously overcoming some of the disadvantages normally associated therewith.

Even still another object of the present invention is to provide a new and improved braking system for use on a towing vehicle and on a towed vehicle for allowing the brakes of a towed vehicle to be applied in conjunction with the brakes of the towing vehicle.

Lastly, it is an object of the present invention to provide a new and improved braking system for use on a towing vehicle and on a towed vehicle comprising vacuum capture means adapted to be coupled to a brake vacuum system of a towing vehicle for capturing vacuum therefrom; vacuum delivery means adapted to be coupled to a towing vehicle for delivering vacuum to a towed vehicle; switch means coupled between the vacuum capture means and the vacuum delivery means, the switch means having one orientation for allowing transfer of vacuum from the vacuum transfer means to the vacuum delivery means and another orientation for preventing such transfer; vacuum reception means adapted to be coupled to a towed vehicle and coupleable with the vacuum delivery means for receipt of vacuum therefrom; actuateable air pressure means adapted to be coupled to a towed vehicle for generating air pressure when actuated; ram means coupled to the air pressure means and adapted for depressing a brake pedal of a towed vehicle when the air pressure means is actuated and adapted for releasing the brake pedal when the air pressure means is deactuated; vacuum switch means coupled to the vacuum reception means, the vacuum switch means having one orientation for actuating the air pressure means upon receipt of vacuum another orientation for preventing such actuation; and check valve switch means coupled to the vacuum switch means and adapted to be coupled to a brake vacuum system of a towed vehicle for receipt of vacuum therefrom, the check valve means having one orientation for only allowing transfer of vacuum from the towing vehicle when the vacuum reception means is coupled with the vacuum delivery means and another orientation for allowing only transfer of vacuum from the towed vehicle when the vacuum reception means is decoupled from the vacuum delivery means of the towing vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
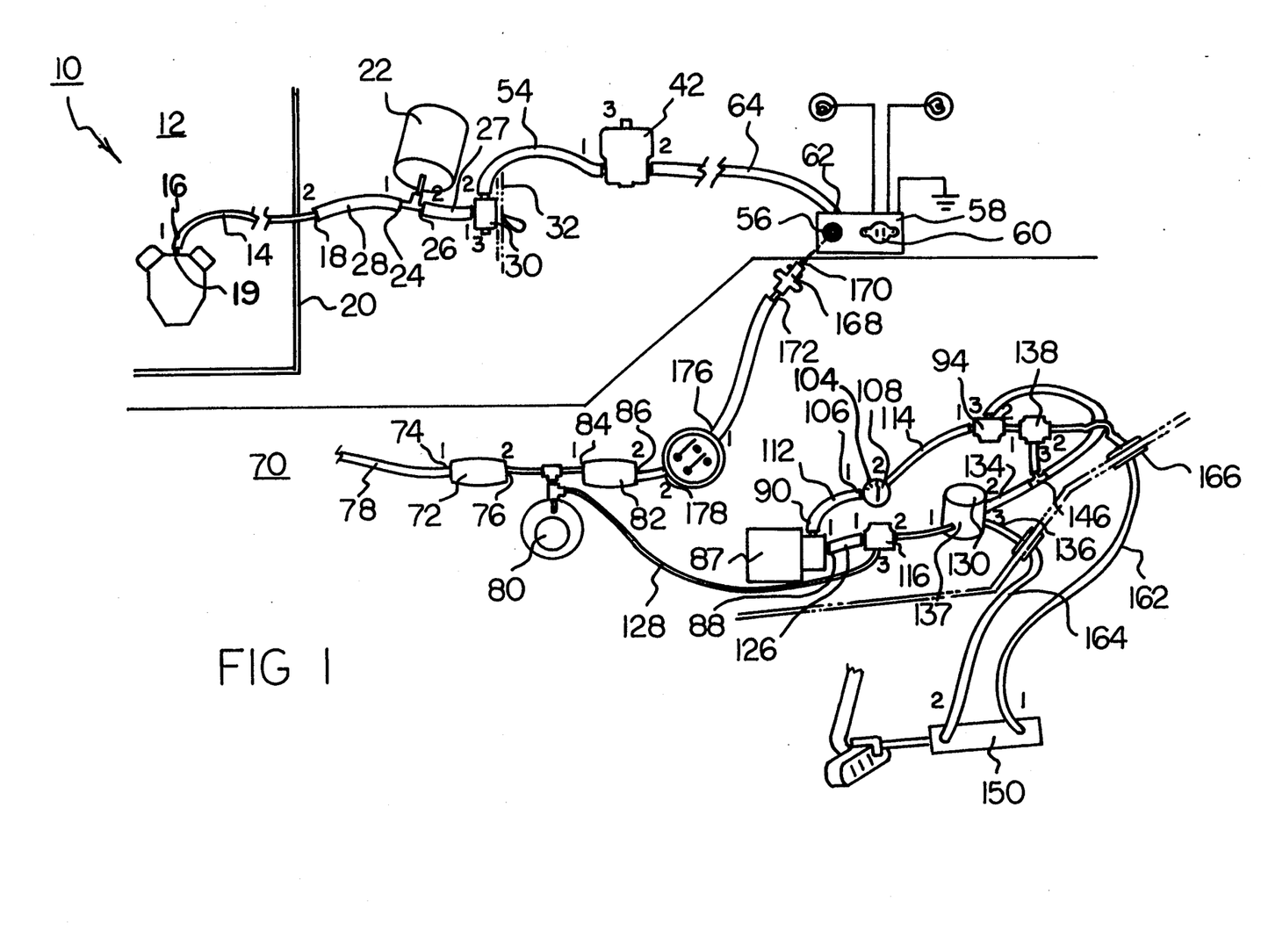
FIG. 1 is a schematic representation of the present invention depicting: the vacuum coupling of the towing vehicle braking subsystem and the vacuum and pneumatic coupling of the towed vehicle braking subsystem.

With reference now to the drawings, and in particular, to FIG. 1 thereof, the preferred embodiment of the new and improved braking system for use on a towing vehicle and on a towed vehicle embodying the principles and concepts of the present invention and generally designated by the reference number 10 will be described.

Specifically, the present invention essentially includes three major components. The major components are the towing vehicle braking subsystem, the towed vehicle braking subsystem, and the break-away subsystem. These components are interrelated to provide the intended function.

More specifically, it will be noted in the various Figures that the first major component is the towing vehicle braking subsystem 12. The towing vehicle braking subsystem is adapted for use in a towing vehicle such as a motorhome. The towing vehicle braking subsystem essentially includes five subcomponents. The subcomponents are the vacuum line, vacuum canister reservoir, manual vacuum switch, first air valve, and coupler. These subcomponents are interrelated for allowing the towing vehicle braking subsystem to perform its intended function.

The first subcomponent of the towing vehicle braking subsystem is the vacuum line 14. The vacuum line is tubular in structure and formed of ¼ inch steel tubing or other tubular material of similar dimension. The vacuum line has a first end 16 and a second end 18. The first end is adapted to be coupled to a vacuum intake manifold 18 of a towing vehicle for receipt and transfer of vacuum therefrom. The second end of the vacuum line is extended through the engine compartment 20 of the towing vehicle.

The second subcomponent of the towing vehicle braking subsystem is the vacuum canister reservoir 22. The vacuum canister reservoir is generally cylindrical in structure. It is used for maintaining vacuum from the intake manifold of a towing vehicle's engine. The vacuum canister reservoir has a first port 24 and a second port 26 provided through a T-shaped coupler extended from the vacuum canister. The first port is coupled to the second end 18 of the vacuum line with a piece of 5/16 inch plastic tubing 28 or other tubular material of similar dimension.

Figure 7:
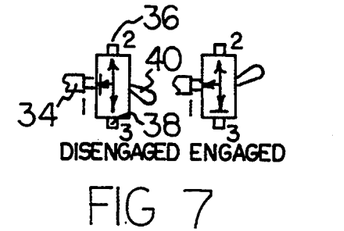
FIG. 7 is a schematic representation of the manual vacuum valve switch of the towed vehicle shown in an inactive orientation and an active orientation. When the manual vacuum valve switch is placed in an inactive orientation, communication with the vacuum canister reservoir is prevented. When the manual vacuum valve switch is placed in an active orientation, communication with the vacuum canister reservoir is allowed.

The third subcomponent of the towing vehicle braking subsystem is the manual vacuum switch 30. The manual vacuum switch is adapted to be actuated by a user for controlling vacuum provided through the vacuum canister reservoir 29. The manual vacuum switch is adapted to be coupled to an instrument panel 32 or a dashboard of the towing vehicle or other location for ease of access. The manual vacuum switch has a first port 34, a second port 36, and a third port 38. The manual vacuum switch has an engaged orientation selected through a lever 40 extended therefrom for allowing communication between the first port and the second port for transfer of vacuum. The manual vacuum switch also has a disengaged orientation for allowing communication between the second port and third port for dissipation of vacuum. See FIG. 7. The first port 34 is coupled to the second port 26 of the vacuum canister. This coupling is performed with a piece of 5/16 inch plastic tubing 27 or other tubular material of a similar dimension.

The fourth subcomponent of the towing vehicle braking subsystem is the first air valve 42. The first air valve is electromagnetically actuated. The first air valve has a first port 44, a second port 46, a third port 48, and an electrically conductive terminal 50 formed thereon for controlling port operation. This terminal is further adapted to be coupled to a foot brake stop light switch 52 on a towed vehicle. The first air valve has an engaged orientation for allowing communication between the first port 44 and the second port 46 for transfer of vacuum when the terminal is electrically energized through activation of the foot brake stop light switch. The first air valve also has a disengaged orientation for allowing communication between the second port 46 and third port 48 for dissipation of vacuum when the terminal is electrically de-energized through deactivation of the foot brake stop light switch. See FIG. 2 and FIG. 3. The first port 44 of the first air valve is coupled with the second port 36 of the manual vacuum switch with a piece of 5/16 inch plastic tubing 54 or tubular material of a similar dimension.

The fifth subcomponent of the towing vehicle braking subsystem is the coupler 56. The coupler is self-closing in structure. It is adapted to be coupled to a rear of a towing vehicle on a mounting bracket 58. The mounting bracket is also adapted to hold a plug connector 60 containing electrically conductive terminals mateable with the electrical system of the towed vehicle for activating its right turn signal lights, left turn signal lights and tail lights. The coupler has a port 62 coupled to the second port 46 of the first air valve with a piece of 5/16 inch plastic tubing 64 or tubular material of a similar dimension. The port is extended outward from a towed vehicle and further adapted to be mated with a quick disconnect self-closing air chuck of a towed vehicle for transfer of vacuum thereto.

The second major component is the towed vehicle braking subsystem 70. The towed vehicle braking subsystem is adapted for use in a towed vehicle and operable in association with the towing vehicle braking subsystem 12. The towed vehicle braking subsystem essentially includes eleven subcomponents. The subcomponents are the first check valve, second check valve, air pump, second air valve, pressure regulator, third air valve, air intake, mechanical mass air release, air ram, air chuck, and vacuum switch. These subcomponents are interrelated for allowing the towed vehicle braking subsystem to perform its intended function.

The first subcomponent of the towed vehicle braking subsystem is the first check valve 72. The first check valve is spring-activated. It has a first port 74 and a second port 76. The first port is adapted to be coupled to an existing vacuum line 78 of a towed vehicle leading to its engine intake manifold. The second port is adapted to be coupled to an existing brake vacuum booster 80 of a towed vehicle.

Figure 6:
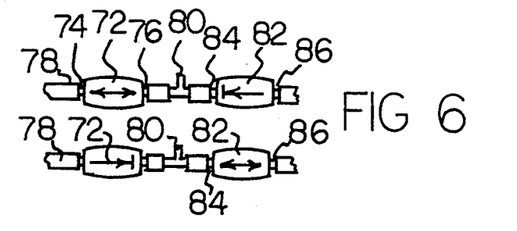
FIG. 6 is a schematic representation of the communication between the spring-activated first check valve and the spring-activated second check valve. When the towed vehicle is driven apart from the towing vehicle, the second check valve is prevented from communicating with the first check valve and the brake vacuum booster. When the towed vehicle is being towed by the towing vehicle, the first check valve is prevented from communicating with the second check valve and the brake vacuum booster.

The second subcomponent of the towed vehicle braking subsystem is the second check valve 82. The second check valve is spring-activated. It has a first port 84 and a second port 86. The first port is coupled to the second port.76 of the first check valve. The first port is further adapted to be coupled to an existing vacuum booster 80 of a towed vehicle. When the towed vehicle is being towed, by the towing vehicle, the first check valve 72 is prevented from communicating with the vacuum booster of the towed vehicle while the second check valve 82 is allowed to communicate with the vacuum booster of the towed vehicle. When the towed vehicle is driven apart from the towing vehicle, the first check valve is allowed to communicate with the vacuum booster of the towed vehicle and the second check valve is prevented from communicating with the vacuum booster of the towed vehicle. See FIG. 1 and FIG. 6. The coupling between the first check valve, second check valve, and vacuum booster of a towed vehicle is performed with a T-shaped coupler.

The third subcomponent of the towed vehicle braking subsystem is the air pump 87. The air pump is operable when electrically energized. The air pump is adapted, to be coupled to a towed vehicle. The air pump has a first port 88, a second port 90, and an electrically conductive terminal 92 formed thereon. The air pump supplies air pressure at the ports when the terminal thereof is electrically energized. The air pump is adapted to be electrically driven at the terminal thereof with a 12 volt power supply, which in the preferred embodiment is the battery of the towed vehicle.

Figure 4:
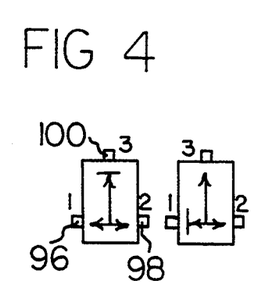
FIG. 4 is a schematic representation of the electromagnetic second valve shown in an engaged orientation and a disengaged orientation.

The fourth subcomponent of the towed vehicle braking subsystem is the second air valve 94. The second air valve is electromagnetically operated. It has a first port 96, a second port 98, a third port 100, and an electrically conductive terminal 102 formed thereon for controlling port operation. The second air valve has an engaged orientation for allowing communication between the first port and second port for transfer of air pressure from the air pump when the terminal thereof is electrically energized. A second air valve also has a disengaged orientation for allowing communication between the first port and third port for dissipation of air pressure when the terminal thereof is electrically de-energized. See FIG. 4.

The fifth subcomponent of the towed vehicle braking subsystem is the pressure regulator 104. The pressure regulator is adapted to be adjusted by a user for controlling and regulating delivery of air pressure from the air pump. The pressure regulator has a first port 106, a second port 108, and a readable pressure gauge 110 formed thereon. The first port is coupled to the second port 90 of the air pump. The second port is coupled with the first port 96 of the second air valve. The coupling between the air pump, pressure regulator, and second air valve is performed with two pieces of tubing 112, 114.

Figure 5:
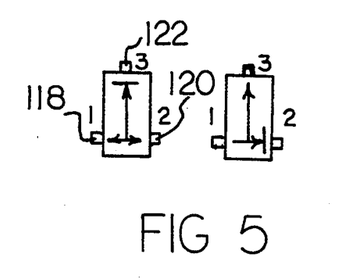
FIG. 5 is a schematic representation of the electromagnetic third valve shown in an engaged orientation and a disengaged orientation.

The sixth subcomponent of the towed vehicle braking subsystem is the third air valve 116. The third air valve is electromagnetically operated. The third air valve has a first port 118, a second port 120, a third port 122, and an electrically conductive terminal 124 formed thereon for controlling port operation. The third air valve has an engaged orientation for allowing communication between the first port and the second port when the terminal is electrically energized for transfer of air pressure. The third air valve also has a disengaged orientation for allowing communication from the first port to the third port when the terminal is de-energized for dissipation of air pressure. See FIG. 5. The first port of the third air valve is coupled to the first port 88 of the air pump with a piece of tubing 126. The third port is adapted to be coupled to the vacuum booster 80 of the towed vehicle with a line 128 terminated at the vacuum booster with a coupler. If the towed vehicle is not equipped with power brakes, the third air valve and the check valves leading to the vacuum booster are eliminated.

The seventh subcomponent of the towed vehicle braking subsystem is the air intake 130. The air intake has a first port 132, a second port 134, a third port 136, and an intake port 137. The first port is coupled to the second port of the third air valve with a piece of tubing. The intake port is adapted to receive external air for subsequent filtering and delivery to the air pump 87.

Figure 8:
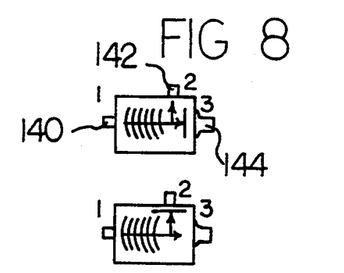
FIG. 8 is a schematic representation of the mechanical mass air release valve shown in an engaged orientation and a disengaged orientation. When the mechanical mass air release valve is placed in an engaged orientation, communication is prevented with the air filter, thereby enabling the air ram to remain pressurized for depressing and activating a brake pedal of a towed vehicle. When the mechanical mass air release is placed in a disengaged orientation, communication with the air filter is allowed, thereby enabling the air ram to be depressurized and released for deactivating a brake pedal of a towed vehicle.

The eighth subcomponent of the towed vehicle braking subsystem is the mechanical mass air release 138. The mechanical mass air release has a first port 140, a second port 142 and a third port 144. The first port is coupled to the second port 98 of the second air valve with a piece of tubing. The third port is coupled to the second port 134 of the air intake and the third port 100 of the second air valve with a T-shaped coupler and associated tubing. The mechanical mass air release has an engaged orientation for allowing communication between the first port and the second port for transfer of air pressure. The mechanical mass air release also has a disengaged orientation for allowing communication between the second port and third port for dissipation of air pressure. See FIG. 8.

Figure 9:
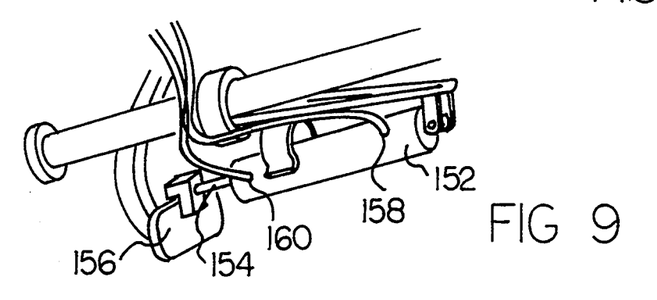
FIG. 9 is a perspective view of the air ram coupled between a steering column of a towed vehicle and its associated brake pedal.

The ninth subcomponent of the towed vehicle braking subsystem is the air ram 150. The air ram is positionable within the driver's compartment of a towed vehicle. It has a tubular and sealed housing 52 securable to the steering column of the towed vehicle using U-shaped ⅛ inch diameter die rods welded in the form of clamps. These clamps are then used for securing the housing to the steering column. The housing is further securable against the steering column through the use of a generally u-shaped spring clip. The air ram includes a plunger 154 having a base end slidably disposed within the housing and a tip end extended therefrom. The tip end is adapted to be coupled to a brake pedal 156 of a towed vehicle. The air ram includes a first port 158 and a second port 160 positioned upon and extended within the housing. The first port is coupled with the second port 142 of the mechanical air release with plastic tubing 162 or similar tubular material extended through the fire wall of the towed vehicle. The tubing is secured within the fire wall with a bushing. The second port of the air ram is coupled to the third port 136 of the air intake with a plastic tubing 164 extended through the fire wall of a towed vehicle. The tubing is securable to the fire wall with a bushing 166. The coupling of the tubing to the air ramp is through the use of quick-disconnect coupler fittings. The plunger of the air ram is extendable in one orientation for depressing a brake pedal of a towed vehicle when the mechanical mass air release is placed in an engaged orientation. The plunger is also retractable in another orientation for releasing a brake pedal of a towed vehicle when the mechanical mass air release is placed in a disengaged orientation. With the mechanical mass air release placed in the engaged orientation, sufficient air pressure is generated within the housing of the air ram to force the plunger forward for depressing the brake pedal. When the mechanical air mass release is placed in the disengaged orientation, sufficient air pressure is released from the housing for allowing the plunger to retract back towards the housing, thus releasing the brake pedal.

The tenth subcomponent of the towed vehicle braking subsystem is the air chuck 160. The air chuck is of the quick-disconnect type and is self-closing in structure. The air chuck has a first port 170 and a second port 172. The first port is mateable with the self-closing coupler 56 of the towing brake subsystem 12.

Figure 2:
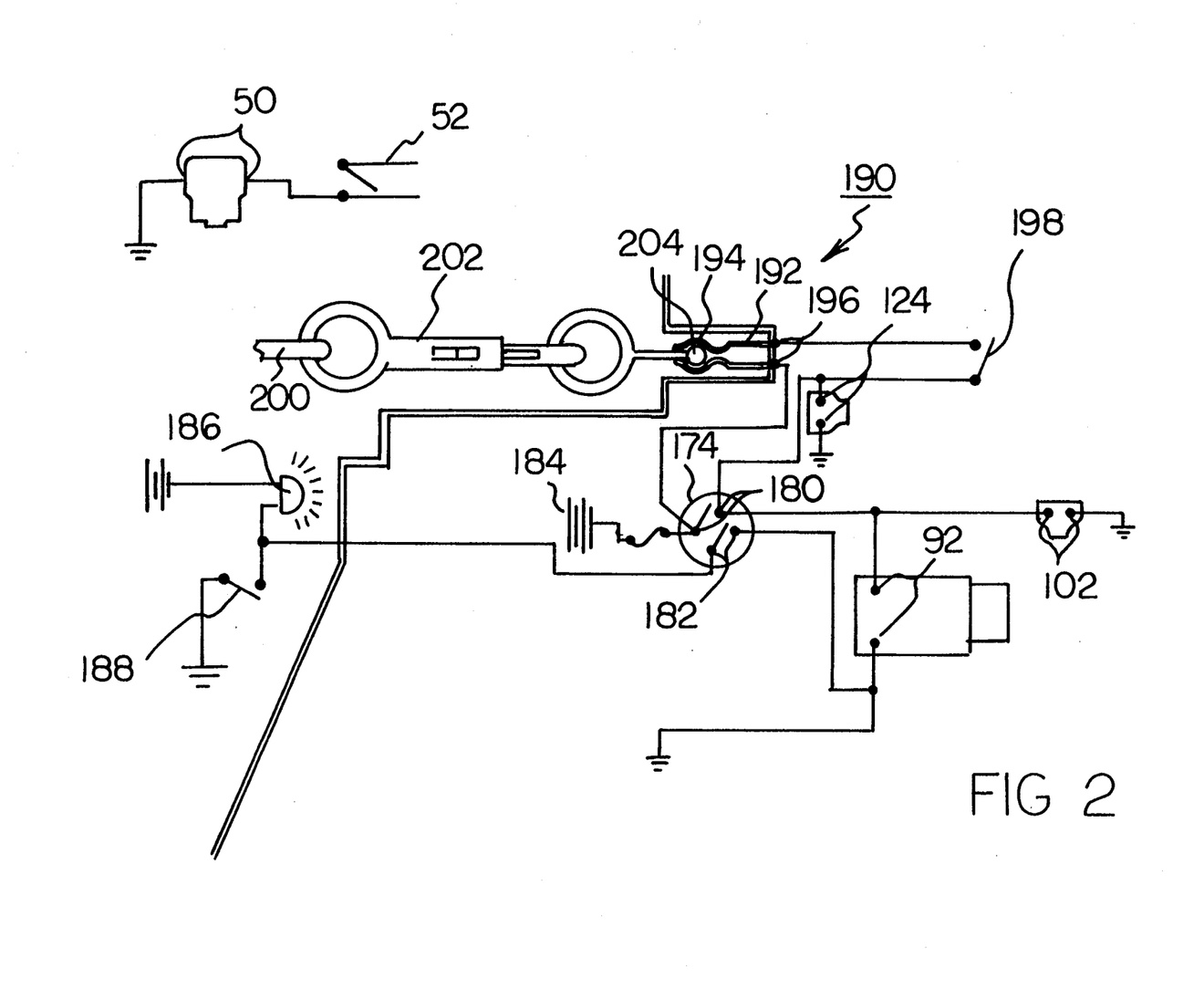
FIG. 2 is a schematic representation of the present invention depicting the electrical coupling of the towing vehicle braking subsystem, the towed vehicle braking subsystem, and the break-away subsystem associated with both the towing and towed vehicle braking subsystems.
Figure 3:
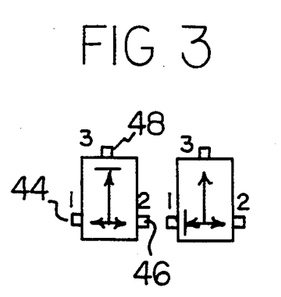
FIG. 3 is a schematic representation of the electromagnetic first valve shown in an engaged orientation and a disengaged orientation.

The eleventh subcomponent of the towed vehicle braking subsystem is the vacuum switch 174. The vacuum switch is pneumatically actuatable and electrically conductive. The vacuum switch is of the double-pole single throw type. The vacuum switch has a first port 176 and a second port 178. The vacuum switch also has a first terminal 180 and a second terminal 182. The first port of the vacuum switch is coupled to the second port 172 of the air chuck. The second port is coupled to the second port 86 of the second check valve. The first terminal is coupled to the terminal of the second air valve 102, the terminal of the third air valve 124, and the terminal of the air pump 92. The first terminal is also adapted to be coupled to a battery 184 of a towed vehicle. The second terminal of the vacuum switch is coupled to the terminal of the air pump 92. The second terminal is also adapted to be coupled to a parking brake light 186 of a towing vehicle or an additional light added to the towed vehicle if desired. The second terminal is also adapted to be coupled to the battery of a towing vehicle and controlled through an ancillary switch 188.

When the towed vehicle braking subsystem is coupled to the towing vehicle braking subsystem through the mating of the self-closing coupler 56 with the air chuck 168 and vacuum is applied to the vacuum switch 174 through depression of the brakes of a towing vehicle, the terminals of the vacuum switch are energized for activating the air pump 87. Thus, by activating the air pump, subsequent depression of a brake pedal 156 of a towed vehicle through application of air pressure at the air ram 150 is accomplished. When the vacuum is removed from the vacuum switch, the terminals of the vacuum switch are deenergized for deactivating the air pump. The deactivation of the vacuum switch allows release of the brake pedal of the towed vehicle through release of air pressure from the air ram. Thus, the vacuum switch serves as the actuatable component for controlling operation of the towed vehicle brake subsystem based on detection of change of vacuum within the towing vehicle braking subsystem through application of the brakes of a towing vehicle.

The third major component is the break-away subsystem 190. The break-away subsystem is adapted for use in a towed vehicle. It associated with the use of the towing vehicle braking subsystem and the towed vehicle braking subsystem. It is also associated with the direct linkage of the towed vehicle to the towing vehicle. The break-away subsystem essentially includes four subcomponents. The subcomponents are the contact switch, activation switch, chain, and clip. These subcomponents are interrelated for allowing the break-away subsystem to perform its intended function.

The first subcomponent of the break-away subsystem is the contact switch 192. The contact switch is adapted to be coupled to a towed vehicle. The contact switch has a pair of spring-loaded prongs 194 on one end and a terminal 196 formed on the other end. The terminal is coupled to the first terminal 180 of the double-pole single throw vacuum switch. The contact switch has an activated orientation when the prongs are engaged with each other and a deactivated orientation when the prongs are disengaged from each other.

The second subcomponent of the break-away subsystem is the activation switch 198. The activation switch is of the single-pole single throw type. It is coupled to the air ram 150. The activation switch is orientable in a closed position for activating the towed vehicle brake subsystem when the towed vehicle is being towed by the towing vehicle. The activation switch is also orientable in an open position for deactivating the towed vehicle brake subsystem when the towed vehicle is being driven separately from the towing vehicle. The activation switch is normally open. The activation-switch is closed when the air ram is secured to the steering column with the spring clip and the towed vehicle is being towing.

The third subcomponent of the break-away subsystem is the chain 200. The chain is formed of a plurality of rigid links and has a first end and a second end. The first end is adapted to be coupled to a towing vehicle.

The fourth subcomponent of the break-away subsystem is the clip 202. The clip is elongated in structure and has a base end and a tip end. The base end is removably coupled to the second end of the chain through the use of a clip-type attachment. The tip end includes an insulated detent 204 formed thereon. This detent is securable between the prongs 194 of the contact switch for placing it in a de-activated orientation. Thus, when the detent is secured between the prongs, the chain interconnects the towing vehicle with the towed vehicle. When a towed vehicle is being towed by a towing vehicle and the insulated detent is removed from a location between the prongs of the spring contact through excess tension on the chain, the spring contact is placed in an activated orientation for engaging the vacuum switch and thus activating the air pump for depressing the brake pedal of a towed vehicle through the air ram.

Figure 10:
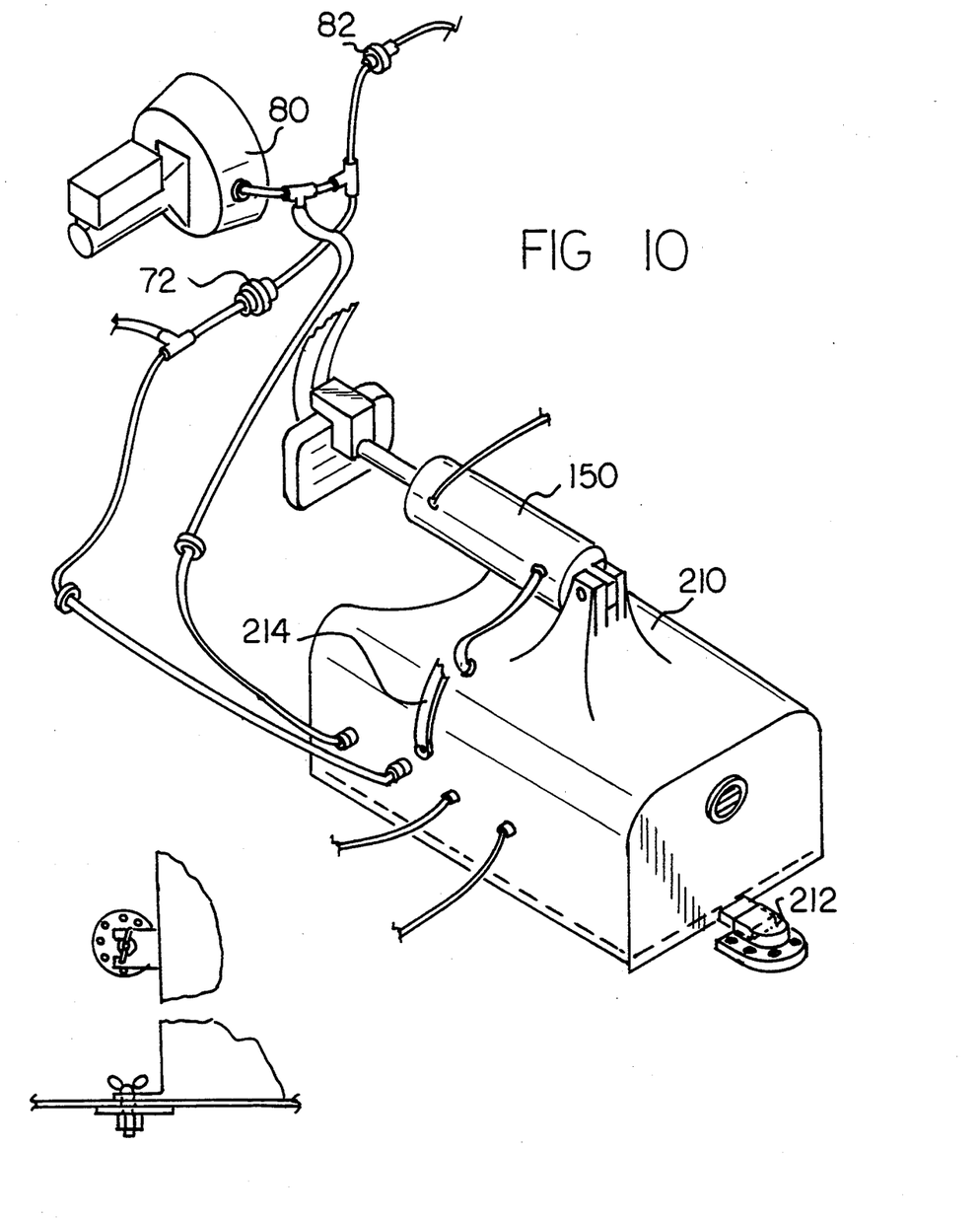
FIG. 10 is a perspective view of an alternate embodiment of the air ram and associated ancillary components constructed in a portable configuration for use in and removal from a towed vehicle.

A second embodiment of the present invention is shown in FIG. 10 and includes, substantially all of the components of the present invention except that the air ram, air pump, air intake, pressure regulator, mechanical mass air release, vacuum switch, and second and third air valves are contained in a portable housing 210. This portable housing is positionable within a driver's compartment of a towed vehicle. Self-closing quick disconnect pneumatic and electrical couplers are used to perform rapid coupling and decoupling of the previously described connections. The housing is securable within the driver's compartment of a towed vehicle with a receiver clamp and plate combination 212. The housing also includes a nylon carrying strap 214. In this configuration, a major part of the present invention may be quickly moved to another towed vehicle for use therein.

The preferred embodiment of the present invention is utilized in a motorhome; the motorhome serves as the towing vehicle. Starting at the motorhome engine, a steel or copper tubing is used to prevent engine heat and vacuum collapsing. After tubing leaves motor compartment, a pliable good grade plastic tubing should be used. Same plastic tubing may be used in towed vehicle engine compartment, since there will be no heat build up from the engine when a vacuum is applied by the motorhome. Next the vacuum canister reservoir in vacuum line supplies ample volume to engage all equipment more rapidly. The manual valve switch on motorhome dash panel will, when open to vacuum lines, allow the electromagnetic first air valve to control the engagement or disengagement of the towed vehicle brakes. When the manual vacuum switch is closed to vacuum lines, the electromagnetic first air valve will not operate to apply braking to towed vehicle.

The plastic vacuum tubing is routed along the most safe and practical route to rear of motorhome and is connected to a female aircraft or marine self-closing-coupler. This coupler should be mounted on an aluminum plate attached to a secure, stable part of the motorhome. A male coupler is then attached to plastic tubing leading on to the vacuum switch, which is located in the towed vehicle engine compartment, this vacuum switch is a low vacuum pressure, double pull, single throw (1 positive and 1 negative) switch which engages the 12 volt air pump, which pumps air into the air ram located in cab of towed vehicle and applies pressure to the existing brake pedal. The amount of pressure is controlled by a pressure regulator in the pressure line from pump to air ram. There is also an electromagnetic second air valve installed in the pressure line and it is also controlled by the above mentioned vacuum switch. This valve will open from the air pump to air ram when the air pump is activated and will open from air ram to air filter when the air pump is de-activated. When the latter occurs, the mechanical mass air release opens, allowing pressure in the ram to escape to filter and the ram quickly releases brake pressure.

Automobiles with power brakes require vacuum pressure to operate properly. This vacuum is taken from the intake manifold of the towing vehicle when it is being driven and vacuum is taken by the vacuum line from the above mentioned vacuum switch when the braking system is engaged. Separation of the two vacuum systems is done with two check valves alternating open/closed positions as required for each mode of operation, driven or towed.

The present invention also incorporates a break-away subsystem which is activated by the removal of a nylon ball and pin which attached to a steel cable or chain to motorhome. In the event the towed vehicle should become uncoupled when being towed by motorhome, the pump will be activated and the air ram will apply pressure to towed vehicle brake pedal. At the same time the electromagnetic third air valve will open the pump suction side to the vacuum booster rather than the air filter and the two check valves, above, to engines of both vehicles will close. This will enhance the braking power of the disconnected towed vehicle.

There is a normally open switch (when the air ram is in stored position), which will close when the ram is positioned to brake pedal, thus eliminating possible engagement of the system by someone outside the car tampering with the contact switch. Braking power of the present invention may be adjusted with the adjustable pressure regulator on line of the air pump's high pressure side (the second port). There is a conductor routed along with the vacuum tubing, connected from the negative side of the vacuum switch and to the park brake light or an auxiliary light, which will notify motorhome driver that the vehicle being towed has engaged brakes. This will occur any time the air pump is activated.

In most states of the U.S., any trailer grossing 2,500 lbs or more must be equipped with self brakes and are required to have a break away stopping system, but it seems U.S. Highway Safety Laws have overlooked the motorhome towing a vehicle behind it. There are several thousand cars and small trucks being towed on U.S. highways each day behind motorhomes, none of which are equipped with a braking system. The present invention will provide the motorhome operator with a very good, reliable, safe means of towing a small vehicle without the extra weight and expense of a tow trailer or hauling trailer.

Many times the need to make a quick stop when traveling in a motorhome towing a vehicle occurs such as a deer or some other animal, or at times, even a pedestrian, will move onto a road or highway. Even assuming the motorhome has adequate braking power, this fast stop places a tremendous amount of pressure of the weakest part of the system, the towbar coupler, and ball coupler. Most western states are very mountainous with some long, steep grades on the highways and roads and descending the grades tends to overheat the breaking system of a motorhome towing a vehicle behind. The present invention provides enormous relief to motorhome brakes since the towed vehicle will be supporting its own stopping weight. The present invention will also decrease tremendously the distance the towed vehicle will travel if it should for any reason become uncoupled from the motorhome. It is also worth mentioning that a portable version of the present invention may be easily installed for use by movers who rent a truck/van from commercial rental agencies or for persons who relocate and who tow a personal vehicle behind during the move.

The present invention is an alternate braking system for a car or truck being towed behind a motor home. The intent of the invention is to be able to apply the brakes of the towed vehicle when applying the brakes of the motor home. This is important when driving on mountain roads, especially downgrades, and when driving at faster speeds. All of the components of the present invention could be contained in a portable, rectangular-shaped housing, or they could be installed separately.

On the portable second embodiment, the housing is secured to the vehicle's floor by a receiver clamp and a steel plate fastened to the floor. Secured longitudinally at the top of the cabinet is an air cylinder ram with an adjustable foot piece secured to the ram shaft that extends out its front. An air pump mounted in the lower left hand corner of the cabinet has its discharge outlet connected to the air ram by a length of plastic hose. Its inlet has a plastic hose running from the pump to the towed vehicle's vacuum booster. The power to operate the pump is supplied by the vehicle's battery via its cigarette lighter. When the components are installed separately, the air ram is mounted to the towed vehicle's steering column. There is a long steel rod that is mounted to the vehicle's steering column with a U-bracket or a muffler clamp. This rod has a metal spring clamp welded to it in which the air ram cylinder snaps in place.

After all the air hoses and electrical connections are made, the present invention is ready for operation. When the air ram is activated by the motor home's brakes the foot piece presses down on the towed vehicle's brake pedal, thus braking the vehicle simultaneously with the motor home. The present invention enables one to drive a motor home and a towed vehicle in a safe manner when negotiating mountainous roads.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A braking system for use on a towing vehicle and on a towed vehicle for allowing the brakes of the towed vehicle to be applied in conjunction with the brakes of the towing vehicle comprising, in combination:

a towing vehicle braking subsystem for use in a towing vehicle further comprising:

a tubular metal vacuum line having a first end and a second end with the first end adapted to be coupled to a vacuum intake manifold of the towing vehicle for receipt of vacuum;

a vacuum canister reservoir for maintaining vacuum from the intake manifold, the vacuum canister reservoir having a first port and a second port with the first port coupled to the second end of the vacuum line;

a manual vacuum switch for controlling vacuum provided through the vacuum canister reservoir, the manual vacuum switch adapted to be coupled to an instrument panel of the towing vehicle, the manual vacuum switch having a first port, a second port, and a third port, with the, manual vacuum switch having an engaged orientation for allowing communication between the first port and the second port for transfer of vacuum and a disengaged orientation for allowing communication between the second port and third port for dissipation of vacuum, the first port coupled to the second port of the vacuum canister reservoir;

an electromagnetic first air valve having a first port, a second port, a third port, and an electrically conductive terminal formed thereon for controlling port operation and with the terminal adapted to be coupled to a foot brake stop light switch on a towed vehicle, the first air valve having an engaged orientation for allowing communication between the first port and the second port for transfer of vacuum when the terminal is electrically energized through activation of the foot brake stop light switch and a disengaged orientation for allowing communication between the second port and the third port for dissipation of vacuum when the terminal is electrically de-energized through deactivation of the foot brake stop light switch, the first port of the first air valve coupled with the second port of the manual vacuum switch; and a self-closing coupler adapted to be coupled to a rear of the towing vehicle, the coupler having a port coupled to the second port of the first air valve, the port further adapted to be mated with a quick disconnect self-closing air chuck for transfer of vacuum;

a towed vehicle braking subsystem for use in a towed vehicle and associated with the towing vehicle braking subsystem, the towed vehicle braking subsystem further comprising:

a spring-activated first check valve having a first port and a second port, the first port adapted to be coupled to a vacuum line of the towed vehicle, the second port adapted to be coupled to a brake vacuum booster of the towed vehicle;

a spring-activated second check valve having a first port and a second port, the first port coupled to the second port of the first check valve, the first port further adapted to be coupled to an existing vacuum booster of the towed vehicle, whereby when the towed vehicle is being towed by the towing vehicle, the first check valve is prevented from communicating with the vacuum booster while the second check valve is allowed to communicate with the vacuum booster, and when the towed vehicle is driven apart from the towing vehicle, the first check valve is allowed to communicate with the vacuum booster and the second check valve is prevented from communicating with the vacuum booster;

an air pump adapted to be coupled to the towed vehicle, the air pump having a first port, a second port, and an electrically conductive terminal formed thereon with the air pump supplying air pressure at the ports when the terminal thereof is electrically energized;

an electromagnetic second air valve having a first port, a second port, a third port, and an electrically conductive terminal formed thereon for controlling port operation, the second air valve having an engaged orientation for allowing communication between the first port and second port for transfer of air pressure when the terminal is electrically energized, the second air valve having a disengaged orientation for allowing communication between the second port and third port for dissipation of air pressure when the terminal is electrically de-energized;

an adjustable pressure regulator having a first port, a second port, and a readable pressure gauge formed thereon, the first port coupled to the second port of the air pump and the second port coupled with the first port of the second air valve, the pressure regulator utilized for regulating air pressure delivered from the air pump;

an electromagnetic third air valve having a first port, a second port, a third port, and an electrically conductive terminal formed thereon for controlling port operation, the third air valve having an engaged orientation for allowing communication between the first port and the second port when the terminal is electrically energized for transfer of air pressure, the third air valve having a disengaged orientation for allowing communication from the first port to the third port when the terminal is deenergized for dissipation of air pressure, the first port coupled to the first port of the air pump and the third port adapted to be coupled to the vacuum booster of the towed vehicle;

an air intake having a first port, a second port, a third port, and an intake port with the first port coupled to the second port of the third air valve and the intake port adapted to receive external air for subsequent delivery to the air pump;

a mechanical mass air release having a first port, a second port, and a third port, the first port coupled to the second port of the second air valve, the third port coupled to the second port of the air intake and the third port of the second air valve, the mechanical mass air release having an engaged orientation for allowing communication between the first port and the second port thereof for transfer of air pressure, the mechanical mass air release having a disengaged orientation for allowing communication between the second port and third port for dissipation of air pressure;

an air ram having a tubular and sealed housing, a plunger having a base end slidably disposed therein and a tip end extended therefrom adapted to be coupled to the brake pedal of the towed vehicle, a first port and a second port with the first port coupled with the second port of the mechanical mass air release and with the second port coupled to the third port of the air intake, the plunger extendable in one orientation for depressing a brake pedal of the towed vehicle when the mechanical mass air release is placed in an engaged orientation and retractable in another orientation for releasing a brake pedal of the towed vehicle when the mechanical mass air release is placed in a disengaged orientation;

a quick-disconnect self-closing air chuck having a first port and a second port with the first port mateable with the self-closing coupler of the towing brake subsystem; and a pneumatically actuateable and electrically conductive double-pole single throw vacuum switch having a first port, a second port, a first terminal and a second terminal, the first port coupled to the second port of the air chuck, the second port coupled to the second port of the second check valve, the first terminal coupled to the terminal of the second air valve and the terminal of the third air valve and the terminal of the air pump and adapted to be coupled to a battery of the towing vehicle, the second terminal coupled to the terminal of the air pump and adapted to be coupled to a brake light of the towing vehicle and adapted to be coupled to a battery of the towing vehicle, whereby when the towed vehicle braking subsystem is coupled to the towing vehicle braking subsystem through mating of the self-closing coupler with the air chuck and vacuum is applied to the vacuum switch, the terminals thereof are energized for activating the air pump and thus allowing subsequent depression of a brake pedal of the towed vehicle through application of air pressure at the air ram, and when vacuum is removed from the vacuum switch, the terminals thereof are deenergized for deactivating the air pump and thus allowing release of a brake pedal of the towed vehicle through release of air pressure from the air ram; and a break-away subsystem for use in the towed vehicle further comprising:

a contact switch adapted to be coupled to the towed vehicle, the contact having a pair of spring-loaded prongs on one and a terminal formed on the other end coupled to the first terminal of the double-pole single throw vacuum switch, the contact switch having an activated orientation when the prongs are engaged and a deactivated orientation when the prongs are disengaged;

a single-pole single throw activation switch coupled to the air ram with the activation switch orientable in a closed position for activating the towed vehicle brake subsystem when the towed vehicle is being towed by the towing vehicle and orientable in an open position for deactivating the towed vehicle brake subsystem when the towed vehicle is being driven apart from the towing vehicle;

a chain having a first end and a second end with the first end adapted to be coupled to the towing vehicle; and an elongated clip having a base end and a tip end, the base end removably coupled to the second end of the chain and the tip end having an insulative detent formed thereon securable between the prongs of the contact switch for placing it in a deactivated orientation, whereby when the towed vehicle is being towed by the towing vehicle and the insulative detent is removed from between the prongs of the spring contact through excess tension on the chain, the spring contact is placed in an activated orientation for engaging the vacuum switch and thus activating the air pump for depressing a brake pedal of the towed vehicle through the air ram.

2. A braking system for use on a towing vehicle and on a towed vehicle comprising:

vacuum capture means adapted to be coupled to a brake vacuum system of a towing vehicle for capturing vacuum therefrom;

vacuum delivery means adapted to be coupled to the towing vehicle for delivering vacuum to a towed vehicle;

switch means coupled between the vacuum capture means and the vacuum delivery means, the switch means having one orientation for allowing transfer of vacuum from the vacuum transfer means to the vacuum delivery means and another orientation for preventing such transfer;

vacuum reception means adapted to be coupled to the towed vehicle and coupleable with the vacuum delivery means for receipt of vacuum therefrom;

actuateable air pressure means adapted to be coupled to the towed vehicle for generating air pressure when actuated;

ram means coupled to the air pressure means adapted for depressing a brake pedal of the towed vehicle when the air pressure means is actuated and adapted for releasing the brake pedal when the air pressure means is deactuated;

vacuum switch means coupled to the vacuum reception means, the vacuum switch means having one orientation for actuating the air pressure means upon receipt of vacuum another orientation for preventing such actuation; and check valve switch means coupled to the vacuum switch means and adapted to be coupled to a brake vacuum system of the towed vehicle for receipt of vacuum therefrom, the check valve means having one orientation for only allowing transfer of vacuum from the towing vehicle when the vacuum reception means is coupled with the vacuum delivery means and another orientation for allowing only transfer of vacuum from the towed vehicle when the vacuum reception means is decoupled from the vacuum delivery means.

3. The braking system for use on a towing vehicle and on a towed vehicle as set forth in claim 2 further including break-away switch means adapted to be coupled to a towed vehicle and further adapted to be releasably coupled between the towing vehicle and the towed vehicle with the break-away switch means actuating the air pressure means when the coupling between the towed vehicle and the towing vehicle is inadvertently broken.

4. The braking system for use on a towing vehicle and on a towed vehicle as set forth in claim 2 wherein the ram means is portable and removably coupleable to the air pressure means and removably coupleable to a brake pedal of the towed vehicle.

* * * * *